US008845335B2

(12) United States Patent
Benatar

(10) Patent No.: US 8,845,335 B2
(45) Date of Patent: Sep. 30, 2014

(54) DEVICE FOR SUPPORTING AND REVERSIBLY ATTACHING AND DETACHING PHOTOVOLTAIC MODULES

(75) Inventor: Lisa Echeverria Benatar, Palo Alto, CA (US)

(73) Assignee: Lisa Benatar, Palo Alto, CA (US)

( * ) Notice: Subject to any disclaimer, the term of this patent is extended or adjusted under 35 U.S.C. 154(b) by 605 days.

(21) Appl. No.: 12/721,260

(22) Filed: Mar. 10, 2010

(65) Prior Publication Data

US 2010/0229919 A1 Sep. 16, 2010

Related U.S. Application Data

(60) Provisional application No. 61/209,814, filed on Mar. 10, 2009.

(51) Int. Cl.
*G09B 23/18* (2006.01)
*H01L 31/042* (2014.01)
*A45C 5/03* (2006.01)
*A45C 15/00* (2006.01)
*F24J 2/52* (2006.01)
*H01L 31/048* (2014.01)

(52) U.S. Cl.
CPC .......... *H01L 31/0422* (2013.01); *G09B 23/181* (2013.01); *A45C 5/03* (2013.01); *A45C 15/00* (2013.01); *F24J 2/523* (2013.01); *F24J 2/5264* (2013.01); *H01L 31/048* (2013.01); *Y02E 10/47* (2013.01); *Y02E 10/50* (2013.01)
USPC ............ 434/301; 136/243; 136/245; 136/246

(58) Field of Classification Search
CPC ................... G09B 23/06; G09B 23/18; G09B 23/181–23/183
USPC .................. 136/245, 251, 252, 259; 434/298, 434/300–303
See application file for complete search history.

(56) References Cited

U.S. PATENT DOCUMENTS

| | | | |
|---|---|---|---|
| 4,896,452 A * | 1/1990 | Smith et al. ..................... 43/57 |
| 5,522,943 A * | 6/1996 | Spencer et al. .............. 136/245 |
| 5,769,260 A * | 6/1998 | Killinger et al. ............. 220/533 |
| 7,989,729 B1 * | 8/2011 | Zhao et al. ............... 219/121.76 |
| 2008/0092941 A1 * | 4/2008 | Kuo ............................. 136/248 |
| 2010/0050428 A1 * | 3/2010 | Becker et al. ................... 29/825 |

* cited by examiner

*Primary Examiner* — Jayne Mershon
(74) *Attorney, Agent, or Firm* — DT Ward, PC; Donna T. Ward; Lingyun Jia

(57) ABSTRACT

A device for the support of photovoltaic modules such that the tilt angles of the photovoltaic modules can be varied to modify the exposure of the photovoltaic modules to sunlight for the purpose of generating solar electricity. The device allows for the reversible attachment and detachment of photovoltaic modules, serves as the storage for the photovoltaic modules when the photovoltaic modules are detached, and is easily portable by a single person.

16 Claims, 4 Drawing Sheets

DEVICE FOR SUPPORTING AND REVERSIBLY ATTACHING AND DETACHING PHOTOVOLTAIC MODULES

RELATED APPLICATION

This application claims priority and other benefits from U.S. Provisional Patent Application Ser. No. 61/209,814, filed Mar. 10, 2009, entitled "A Device for Supporting and Reversibly Attaching and Detaching Photovoltaic Modules". Its entire content is specifically incorporated herein by reference.

TECHNICAL FIELD OF THE INVENTION

The present invention relates to the field of devices for the support of photovoltaic modules.

BACKGROUND

When students perform experiments using solar modules, the modules must be affixed to a surface so that module position is constant while students are taking measurements. If students must hold the solar modules, not only does the module position vary but also students' hands are not available for recording measurements.

One of the critical parameters during measurements of power produced by solar modules is the angle of incidence of incoming light. When experimental solar modules are mounted on a surface whose tilt angle cannot be easily set to known tilt angles, students cannot associate numerical tilt angle values with measured power output from the solar modules. This association is valuable as students compare the angles that they measure to produce optimized power output to angles that constrain mounting of solar modules in real-life situations, such as roof pitch. The association between numerical tilt angle values and measured power output is also important as students learn about the relationship between optimum tilt angles and local latitude. A module-mounting surface that can be placed in tilted positions with known angles of tilt enables the experimenter to observe quantitatively the effect of angle of incidence of incoming light on power delivered by the modules.

Storing and transporting science equipment is often a challenge for classroom teachers. A solar module mounting apparatus that also functions as an easy-to-carry storage container for the solar modules and other experimental equipment enables a complete set of materials to be stored compactly and transported easily.

Existing solar energy experimental kits have components that can be used for carrying out experiments with solar modules, but the kits do not include mounting surfaces. Instead, students must place modules on the ground, hold modules, or create their own tilted mounting surface. Thus these other kits also do not include mounting surfaces that can be set to known tilt angle values or that are part of the kit container itself.

What is needed, therefore, is a device for the support of photovoltaic modules at specific tilt angles that will also provide for the storage and transport of the photovoltaic modules along with the associated components necessary for completing and measuring an electrical circuit.

SUMMARY

The present invention features a device for the support, storage and/or transport of photovoltaic modules. In one embodiment, the device for the support of photovoltaic modules is devised such that the tilt angles of the photovoltaic modules can be varied to modify the exposure of the photovoltaic modules to sunlight for the purpose of generating electricity.

In another embodiment, the device allows for the reversible attachment and detachment of photovoltaic modules. In another embodiment, the device serves for the storage of photovoltaic modules once the photovoltaic modules are detached. In yet another embodiment, the device including its content can easily be carried by a single person. In a further embodiment, the device is a container with a lid that can be positioned at various tilt angles. The lid provides an external flat surface sufficiently large to support the attachment of one or more photovoltaic modules in such a way that they do not overlap.

The above summary is not intended to include all features and aspects of the present invention nor does it imply that the invention must include all features and aspects discussed in this summary.

DRAWINGS

The accompanying drawings illustrate embodiments of the invention and, together with the description, serve to explain the invention. These drawings are offered by way of illustration and not by way of limitation; it is emphasized that the various features of the drawings may not be to-scale.

FIG. 1 illustrates, in accordance with embodiments of the present invention, how various numbers of photovoltaic modules can be attached to the hinged lid of the device at various positions on the external surface of the hinged lid of the device. FIG. 1 shows furthermore an embodiment of the device where strips of VELCRO® are affixed to the bottom and top edge of the hinged lid to serve for the attachment of the photovoltaic modules.

FIG. 2 illustrates, in accordance with embodiments of the present invention, a lid angle adjuster on the inside of the hinged lid of the device; the hinged lid can be set to various different tilt angles by means of a brace attached to the lid and notches in the box where said brace can be held to a fixed position. FIG. 2 shows furthermore embodiments of the device where different tilt angles, for example, 20 degrees and 60 degrees, are achieved once the photovoltaic modules are attached to the hinged lid.

DEFINITIONS

Figure 1:
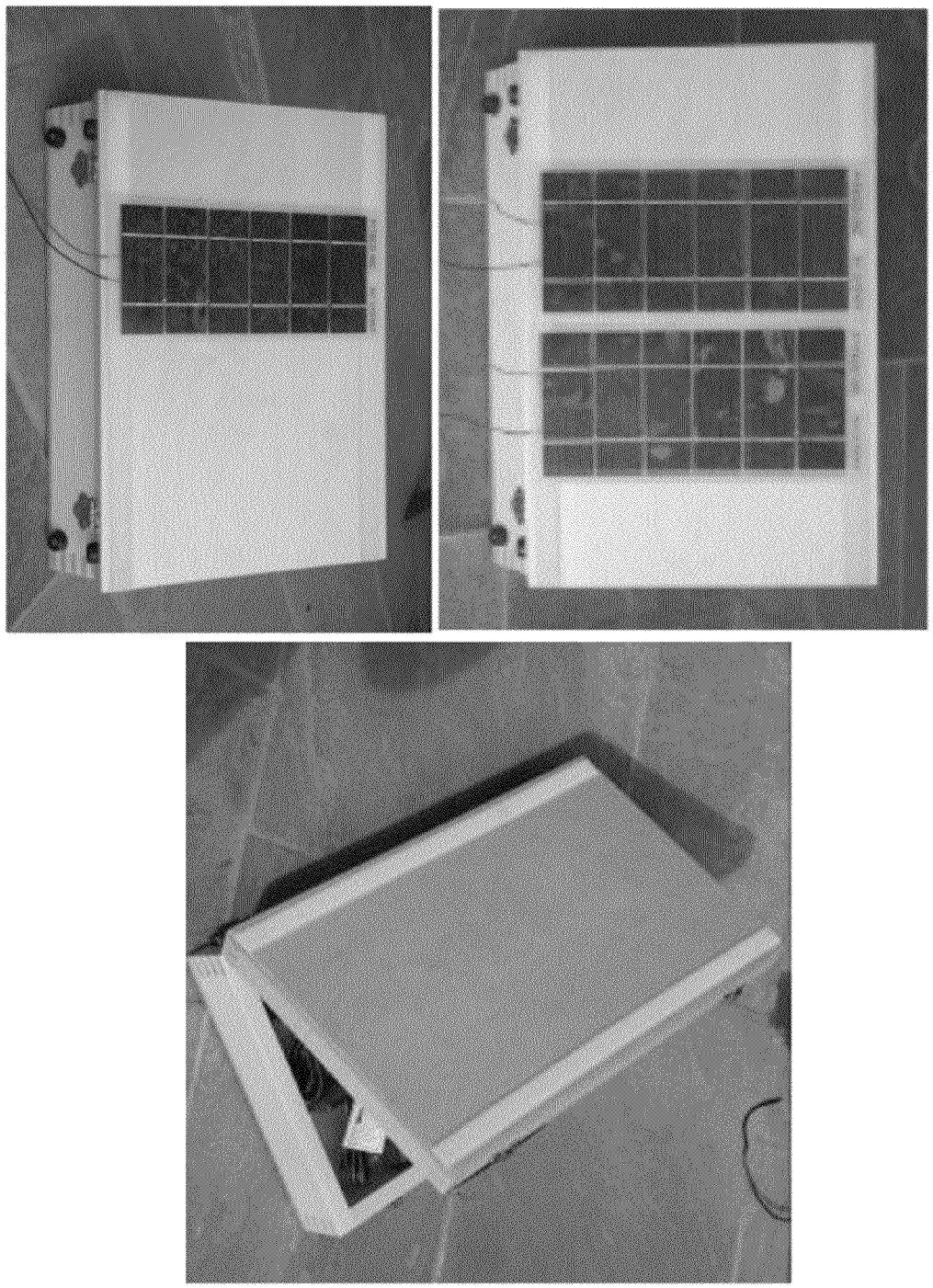
Figure 2:
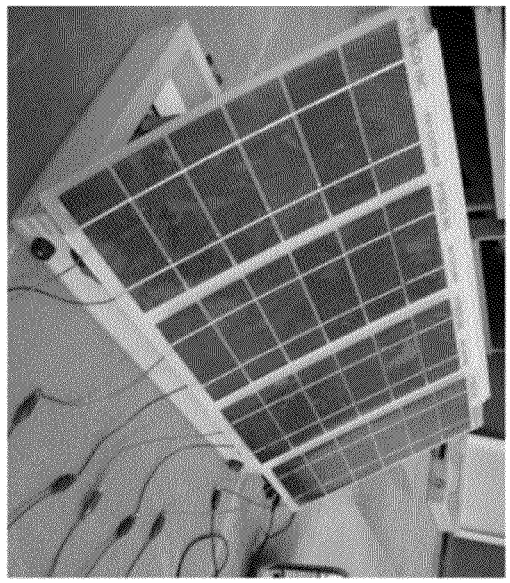
Figure 2:
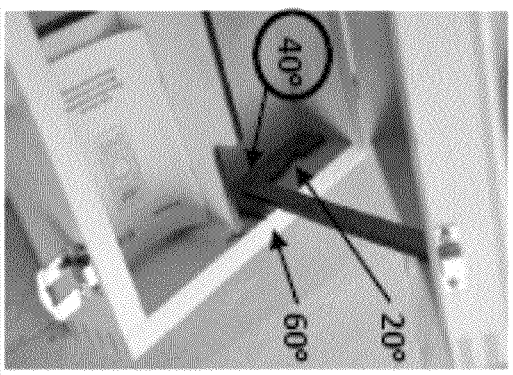
Figure 2:
Figure 2:
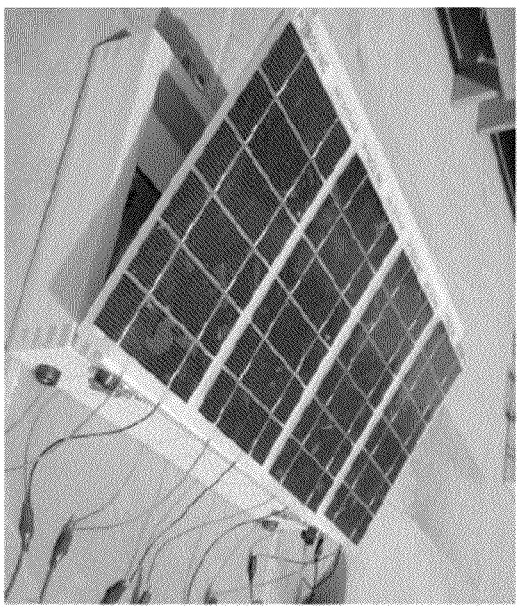
Figure 3:
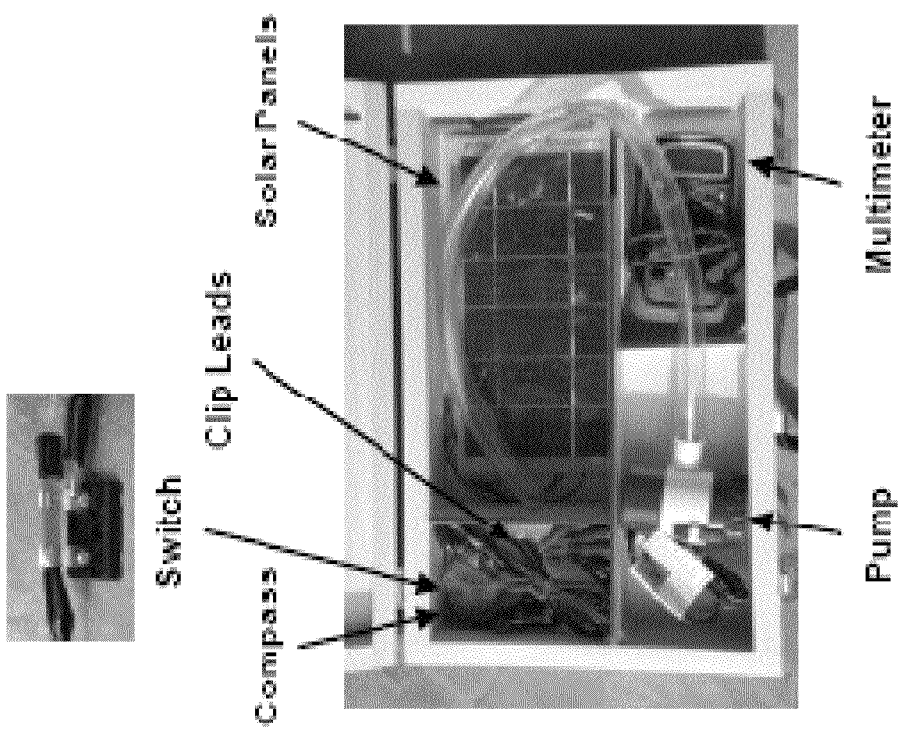
FIG. 3 illustrates, in accordance with embodiments of the present invention, the use of the device for storage of electrical circuit components.
Figure 4:
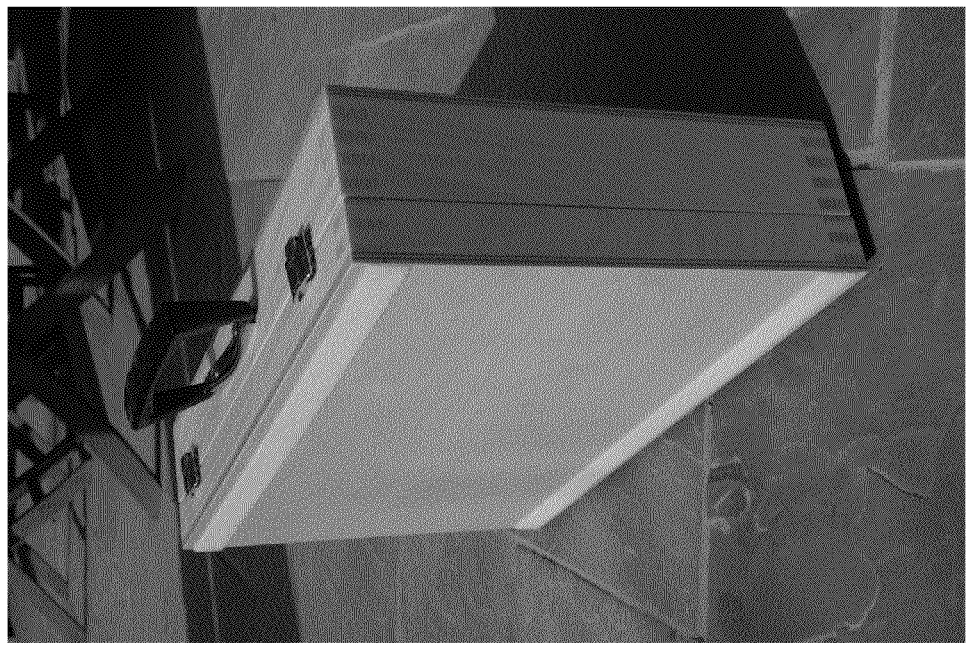
FIG. 4 illustrates, in accordance with embodiments of the present invention, the use of the device, once closed, for carrying and transporting electrical circuit components, with an optional handle for carrying.

Unless defined otherwise, all technical and scientific terms used herein have the same meaning as commonly understood by a person of ordinary skill in the art to which this invention belongs.

The terms "photovoltaic" and "solar" are used interchangeably and refer to the use of semi-conductor cells (solar cells) to convert radiant energy from the Sun into electrical energy or electricity upon exposure to sunlight.

The term "photovoltaic modules" or "solar modules", as used herein, relates to solar cells connected in series and packaged for mounting.

The term "tilt angles", as used herein, relates to angles between a mounting surface and a horizontal surface.

The term "reversible attachment-detachment", as used herein, refers to the ability to readily and reversibly attach and detach one object to another at any position by manual means.

The term "reversible attachment-detachment of one or more photovoltaic modules to the external surface of the lid" refers to the ability to readily and reversibly attach and detach one or more photovoltaic modules to any position on the external surface of the lid by manual means.

DETAILED DESCRIPTION

In one aspect, the device is a box sufficiently large to provide for the storage of photovoltaic modules, while also being of sufficiently small size to be easily portable by hand. In a further aspect, the box also allows for the storage of other components necessary to complete an electric circuit and to measure the current and voltage of such circuit. The electrical components may include but are not limited to conducting wires, a power supply, a multimeter and a load. The box and its contents can be easily carried by a single person by means of a handle, strap or other such mechanism attached to the box.

In a further embodiment, the device is a container with a lid that can be positioned at various tilt angles. The lid provides an external flat surface sufficiently large to support the attachment of one or more photovoltaic modules in such a way that they do not overlap.

Suitable means for variable attachment-detachment of one or more photovoltaic modules to the external surface of the lid include but are not limited to a fastening mechanism such as VELCRO® where the external surface of the lid has areas of the VELCRO® loop fastening side and the underside of the photovoltaic modules has areas of the VELCRO® hook fastening side. Variable attachment-detachment means do not require the use of tools to implement. Therefore, brackets are excluded. The lid can be fixed to the container by a hinge, and held open and positioned at specific angles by means of a brace in the form of a bar that is attached to the lid and contacting the box at one or more fixed positions, or attached to the box and contacting the lid at one or more fixed positions, such that the lid is held at specific angles such as 20, 04 or 60 degrees. The brace provides a means of readily and manually altering the position of the lid so that one or more tilt angles for the photovoltaic modules can be achieved when the photovoltaic modules can be achieved when the photovoltaic modules are attached to the external surface of the lid and exposed to sunlight for the purpose of generating electricity.

Although the foregoing invention and its embodiments have been described in some detail by way of illustration and example for purposes of clarity of understanding, it is readily apparent to those of ordinary skill in the art in light of the teachings of this invention that certain changes and modifications may be made thereto without departing from the spirit or scope of the appended claims. Accordingly, the preceding merely illustrates the principles of the invention. It will be appreciated that those skilled in the art will be able to devise various arrangements which, although not explicitly described or shown herein, embody the principles of the invention and are included within its spirit and scope.

What is claimed is:

1. A device comprising: an educational kit, said kit comprising:
   a) at least one photovoltaic module, each module having a top surface and an underside with attachment sites on the underside;
   b) at least one multimeter that measures current or voltage;
   c) a container with a lid exhibiting an external surface, said container comprising:
      i) a plurality of storage areas within the container, at least one storage area for storing said at least one photovoltaic module and at least one storage area for storing said multimeter;
      ii) attachment sites at various positions on the external surface of the lid that correspond to the attachment sites on the underside of said at least one photovoltaic module; and
      iii) means for temporarily fixing a position of said lid at a plurality of tilt angles when measured in degrees; and
      iv) electrical connection means for completing an electric circuit from said at least one photovoltaic module to said multimeter when said at least one photovoltaic module is attached to said lid;
   wherein current or voltage is measured real time when said lid is fixed at said plurality of tilt angles to observe quantitatively the effect an angle of incidence for incoming light has on current or voltage delivered by the at least one photovoltaic module.

2. The device of claim 1 where the lid is attached to the container by means of a hinge, and where the lid can easily be adjusted and fixated so as to vary the tilt angle of the attached one or more photovoltaic modules, and where the external surface of the lid has areas of a fastening mechanism that will attach to the underside of said at least one photovoltaic module also having areas of a fastening mechanism.

3. The device of claim 1 further comprises other components necessary to complete an electric circuit and to measure current and voltage of such circuit, wherein said current and voltage at a known tilt angle enables an experimenter to observe quantitatively the effect of angle of incidence of incoming light on power delivered by said one or more individual photovoltaic modules.

4. The device of claim 3, where other components necessary to complete an electric circuit and to measure current and voltage of such circuit consist of conducting wires, a power supply and a load.

5. The device of claim 1 further comprising at least one metal latch comprising a top piece and a bottom piece wherein the top piece is attached to the lid and the bottom piece is attached to the container.

6. The device of claim 1, wherein the plurality of storage areas are for storage of said at least one photovoltaic modules and other components necessary to complete an electric circuit and to measure current and voltage of such circuit.

7. The device of claim 1, wherein the fixing means comprises three permanently affixed notches attached to the inner surface wall in the compartment for storing the one or more photovoltaic modules and in positions for generating a tilt angle of 20, 40 or 60 degree.

8. The device of claim 1, wherein the attachment sites on the external surface of the lid are located anywhere along the long edges of the external surface of the lid.

9. The device of claim 1, wherein the attachment sites on the external surface of the lid are detachable Velcro attachment sites.

10. The device of claim 9, wherein the Velcro attachment sites on the external surface of the lid are areas for Velcro loop fastening side and the attachments sites on the underside of said one or more individual photovoltaic modules are areas for Velcro fastening hook side.

11. The device of claim 9, wherein the detachable Velcro attachment sites support said at least one photovoltaic module and said at least one photovoltaic module comprises one individual photovoltaic module.

12. The device of claim 9, wherein the detachable Velcro attachment sites support said at least one photovoltaic module and said at least one photovoltaic module comprises two individual photovoltaic modules.

13. The device of claim 9, wherein the detachable Velcro attachment sites support said at least one photovoltaic module and said at least one photovoltaic module comprises four individual photovoltaic modules.

14. The device of claim 13, wherein two of the four photovoltaic modules extend beyond the external surface of the lid.

15. The device of claim 14, wherein the two photovoltaic modules extend the same distance from the external surface of the lid.

16. The device of claim 13, wherein the four photovoltaic modules do not overlap.

* * * * *